US012774167B2

(12) United States Patent
Adamik et al.

(10) Patent No.: US 12,774,167 B2
(45) Date of Patent: Oct. 27, 2026

(54) CONVEYOR AND METHOD THEREOF

(71) Applicant: Intelligrated Headquarters, LLC, Mason, OH (US)

(72) Inventors: Petr Adamik, Jihlava (CZ); Jakub Barcuch, Valasske Klobouky (CZ); Jan Kazda, Brno (CZ); Martin Menoušek, Černá Hora (CZ); Zdenek Jasa, Velka Bites (CZ)

(73) Assignee: Intelligrated Headquarters, LLC, Mason, OH (US)

( * ) Notice: Subject to any disclaimer, the term of this patent is extended or adjusted under 35 U.S.C. 154(b) by 88 days.

(21) Appl. No.: 18/922,004

(22) Filed: Oct. 21, 2024

(65) Prior Publication Data

US 2026/0109545 A1 Apr. 23, 2026

(51) Int. Cl.
*B65G 23/44* (2006.01)
*B65G 23/04* (2006.01)
*B65G 39/20* (2006.01)

(52) U.S. Cl.
CPC ............. *B65G 23/44* (2013.01); *B65G 23/04* (2013.01); *B65G 39/20* (2013.01)

(58) Field of Classification Search
CPC ....................................................... B65G 23/44
USPC .................. 198/813, 814, 816; 474/136, 138
See application file for complete search history.

(56) References Cited

U.S. PATENT DOCUMENTS 5,030,173 A * 7/1991 Bryant ................... B65G 23/44
474/138
8,910,778 B1 12/2014 Francisco et al.
10,384,879 B2 * 8/2019 German ................. B65G 15/62
10,543,989 B2 1/2020 Francisco
2023/0132219 A1 4/2023 Van Der Salm et al.

FOREIGN PATENT DOCUMENTS

CN 215853420 U 2/2022
DE 102019006575 A1 3/2021

OTHER PUBLICATIONS

Royal Machine Solutions, "Conveyor Belt Tracking & Tensioning | Royal Conveyors", Nov. 10, 2021, https://www.youtube.com/watch?v=fpmMQnjTBjA (Year: 2021).*
Honeywell, "M-Series Case, Tote and Polybag Conveyor Systems", Brochure, dated Feb. 2021, retrieved from the Internet at https://info.intelligrated.com/rs/669-GGZ-114/images/%28CTPBR%28ENEU%29-Case_Tote_Poly_LR.pdf on Oct. 28, 2025, 8 pages.

* cited by examiner

*Primary Examiner* — Gene O Crawford
*Assistant Examiner* — Amari J Meddling
(74) *Attorney, Agent, or Firm* — Alston & Bird LLP

(57) ABSTRACT

A conveyor is disclosed. The conveyor comprises a roller shaft coupled to a side rail, a conveyor belt positioned around the roller shaft, and a tensioner assembly coupled to the roller shaft. The tensioner assembly is configured to adjust a tension of the conveyor belt. The tensioner assembly comprises a tensioner movably coupled to the side rail. The tensioner assembly further comprises a bracket rigidly coupled to the side rail. The tensioner assembly further comprises a spring positioned between the tensioner and the bracket. The spring is configured to compress when the tension of the conveyor belt is increased by the tensioner assembly. Further, the tensioning assembly comprises an indicator positioned parallel to the spring. The indicator is configured to indicate the tension of the conveyor belt.

20 Claims, 5 Drawing Sheets

CONVEYOR AND METHOD THEREOF

TECHNOLOGICAL FIELD

Example embodiments of the present disclosure generally relates to a conveyor, and more particularly relates to a conveyor having a built-in indicator.

BACKGROUND

Efficiency and reliability of a conveyor heavily depend on precise tensioning of a conveyor belt. Maintaining proper tension in the conveyor belt is crucial for optimal performance of the conveyor. Proper tensioning ensures effective force transfer from the driven pulley to the conveyor belt, allowing the conveyor to operate smoothly and efficiently. However, determining the proper tension can be challenging, and improper tensioning can lead to significant operational issues. If the tension is too low, the conveyor belt may slip on the driven pulley, causing potential damage to the conveyor belt and other components. On the other hand, if the tension is too high, the over-tensioning can excessively overstress the conveyor belt, the driven pulley, and other components. The over-tensioning not only accelerates wear and tear but also increases power consumption of the conveyor. The conveyor typically includes tensioners on both sides of a conveyor frame. However, the tensioners lack indicators or measurement tools to guide operators on how much tension is being applied.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a conveyor is disclosed. The conveyor comprises a side rail, a roller shaft coupled to the side rail, a conveyor belt positioned around the roller shaft, and a tensioner assembly coupled to the roller shaft. The tensioner assembly is configured to adjust a tension of the conveyor belt. The tensioner assembly comprises a tensioner movably coupled to the side rail. The tensioner assembly further comprises a bracket rigidly coupled to the side rail. The tensioner assembly further comprises a spring positioned between the tensioner and the bracket. The spring is configured to compress when the tension of the conveyor belt is increased by the tensioner assembly. Further, the tensioner assembly comprises an indicator positioned parallel to the spring. The indicator is configured to indicate the tension of the conveyor belt.

In some embodiments, the tensioner assembly comprises a tensioning rod positioned within the tensioner. Further, the tensioner assembly comprises a tensioning bolt coupled to the tensioning rod and positioned within a hole of the tensioner and a hole of the tensioning rod. The tensioner assembly is coupled to the roller shaft via the tensioning rod.

In some embodiments, rotation of the tensioning bolt in a first direction facilitates in sliding the tensioning rod and the tensioner towards each other to pull the conveyor belt via the roller shaft and increase the tension of the conveyor belt. The first direction corresponds to a clockwise direction.

In some embodiments, rotation of the tensioning bolt in a second direction facilitates in sliding the tensioning rod and the tensioner away from each other to push the conveyor belt via the roller shaft and decrease the tension of the conveyor belt. The second direction corresponds to a counter-clockwise direction.

In some embodiments, the tensioner is movably coupled to the side rail of the conveyor via a plurality of bolts and a plurality of slots fabricated on the side rail. In some embodiments, each slot of the plurality of slots provides a degree of movement to a corresponding bolt of the plurality of bolts for providing a sliding movement to the tensioner. In some embodiments, each bolt of the plurality of bolts is loosened from a corresponding slot during tensioning of the conveyor belt and each bolt is tightened within the corresponding slot when a desired tension is achieved.

In some embodiments, the spring has a predefined stiffness. The predefined stiffness is calibrated based at least on an elongation and a width of the conveyor belt.

In some embodiments, the indicator corresponds to a scale that is calibrated with a predefined tension and is configured to indicate an amount of tension applied on the conveyor belt.

In some embodiments, the indicator is positioned on the tensioner or coupled to the side rail of the conveyor.

In another example embodiment, a tensioner assembly is disclosed. The tensioner assembly is configured to be coupled to a roller shaft of a conveyor. The tensioner assembly comprises a tensioner configured to be movably coupled to a side rail of the conveyor. The tensioner assembly further comprises a bracket configured to be rigidly coupled to the side rail. The tensioner assembly further comprises a spring positioned between the tensioner and the bracket. The spring is configured to compress when the tension of a conveyor belt is increased by the tensioner assembly. Further, the tensioner assembly comprises an indicator configured to be positioned parallel to the spring. The indicator is configured to indicate the tension of the conveyor belt.

In yet another example embodiment, a method is disclosed. The method comprising steps of coupling a roller shaft to a side rail. The method further comprising steps of positioning a conveyor belt around the roller shaft. Further, the method comprising steps of movably coupling a tensioner to the side rail. The method further comprising steps of rigidly coupling a bracket to the side rail. Further, the method comprising steps of compressing a spring when the tension of the conveyor belt is increased by a tensioning assembly. The spring is positioned between the tensioner and the bracket. Thereafter, the method comprising steps of indicating, via an indicator, the tension of the conveyor belt. The indicator is positioned parallel to the spring.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
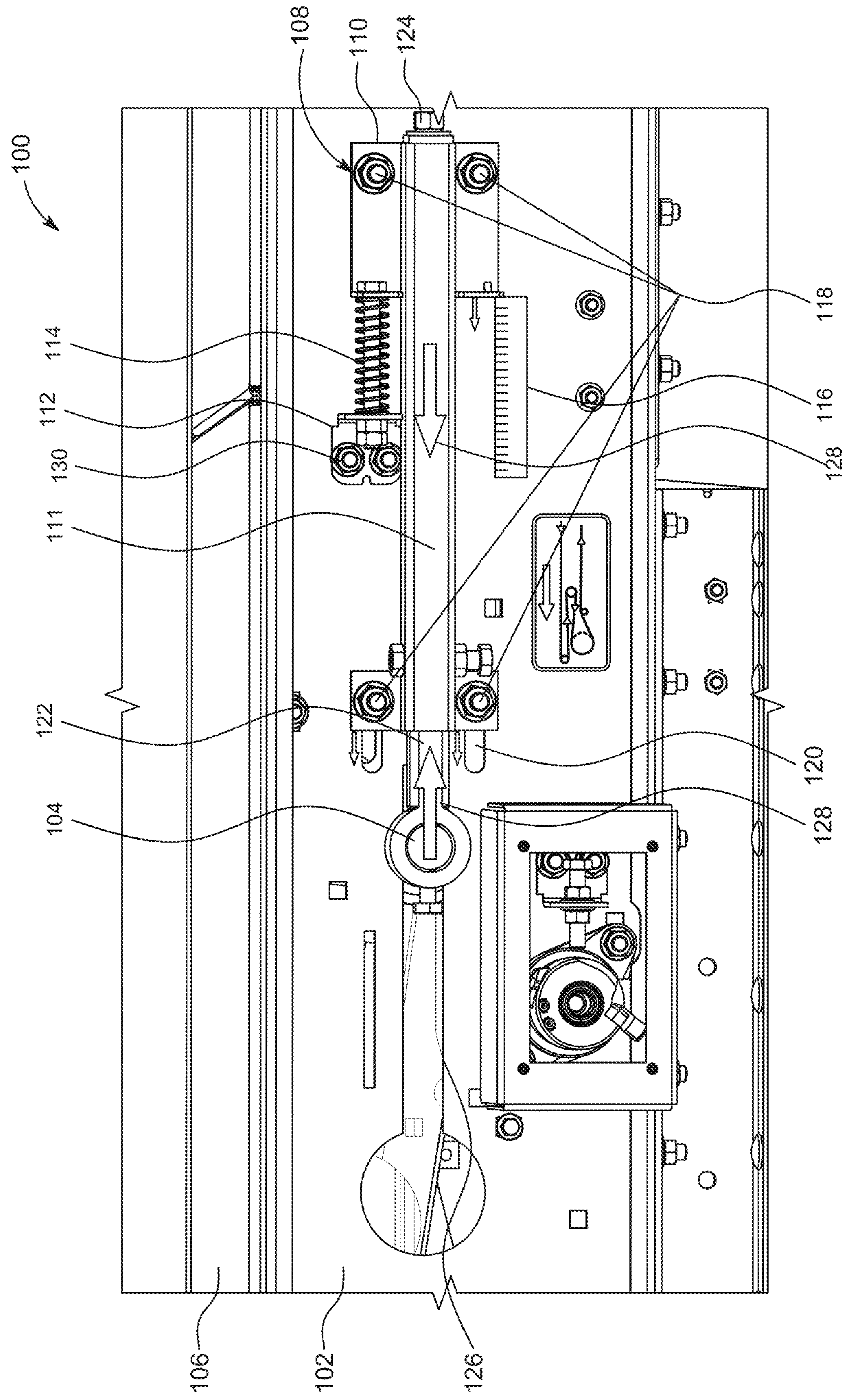
Figure 2A:
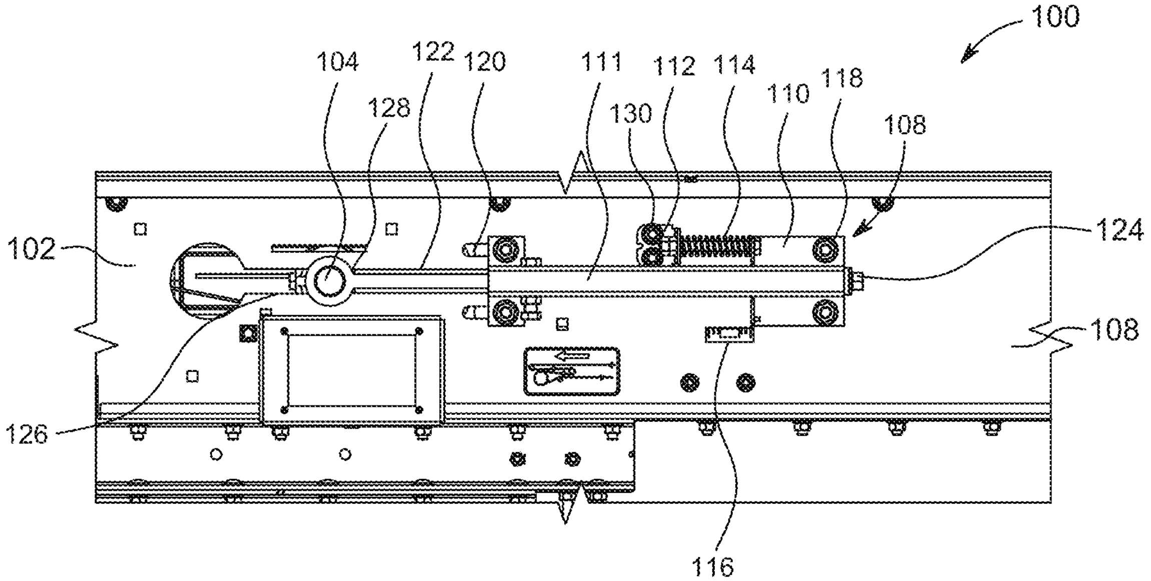
Figure 2B:
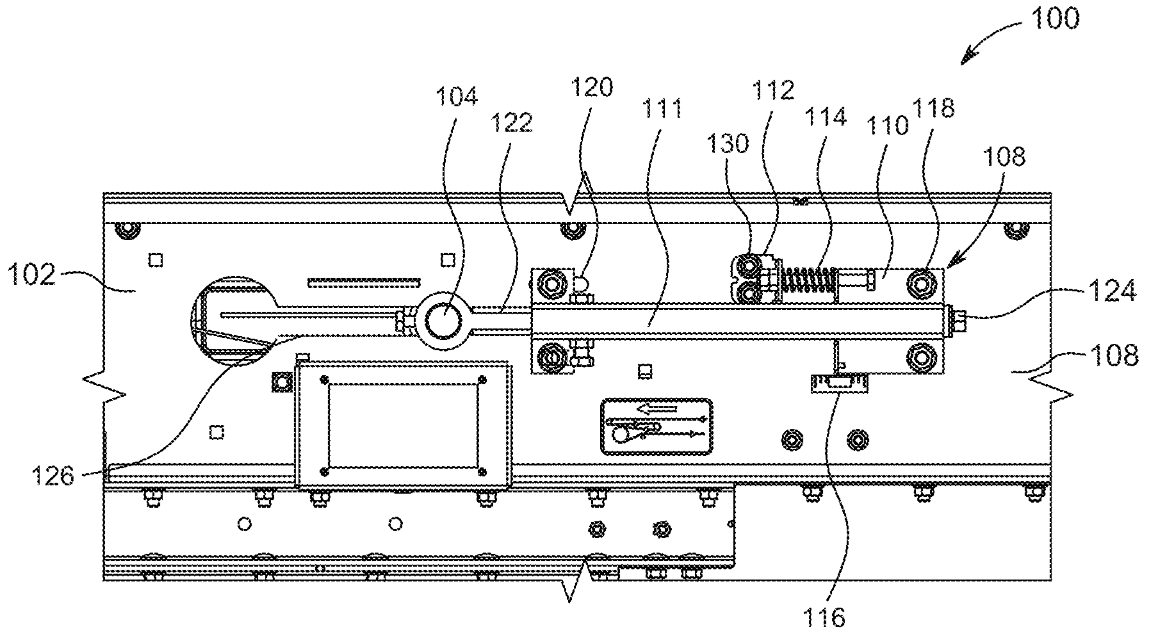
Figure 3A:
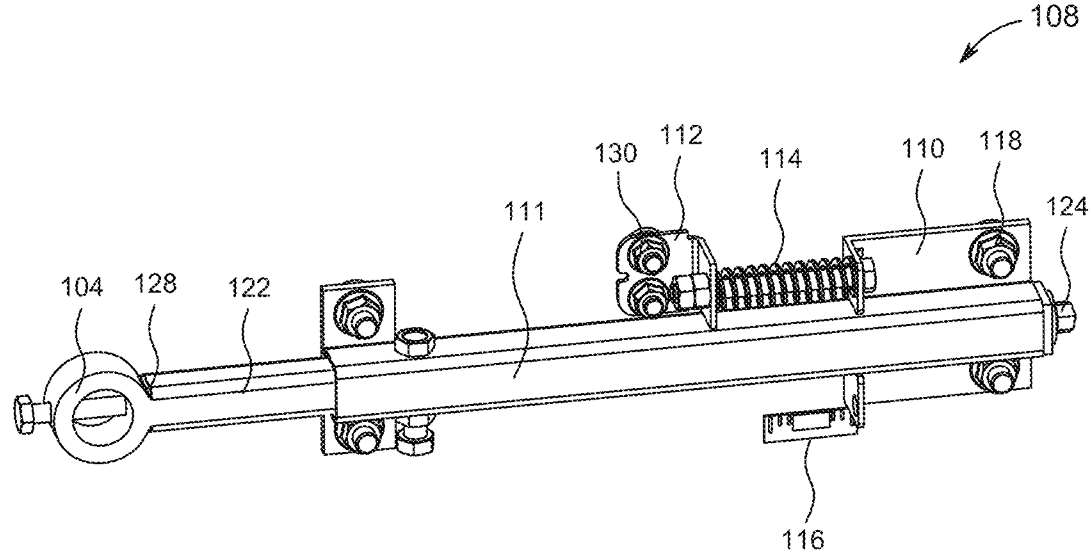
Figure 3B:
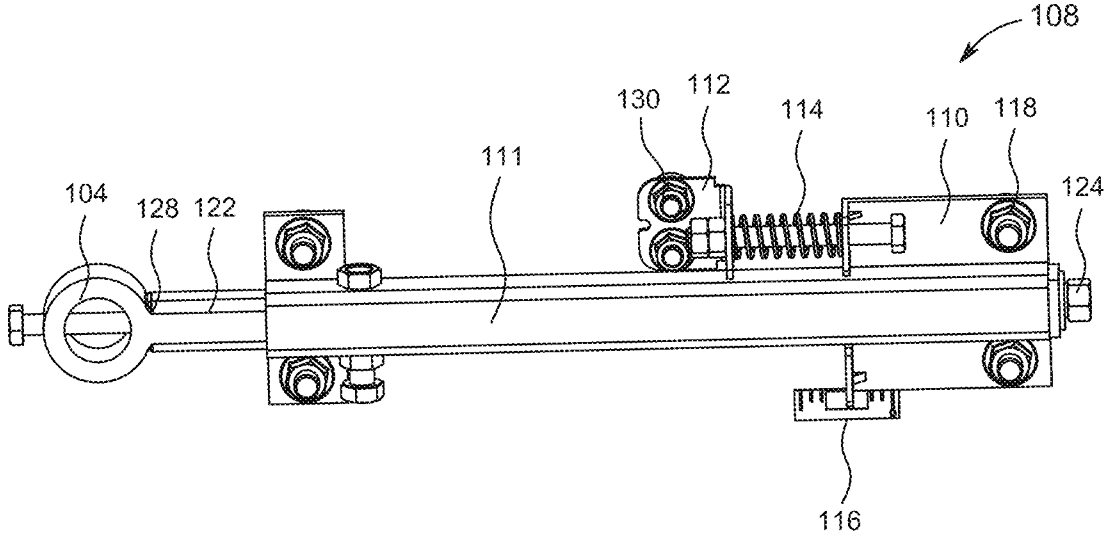
Figure 4A:
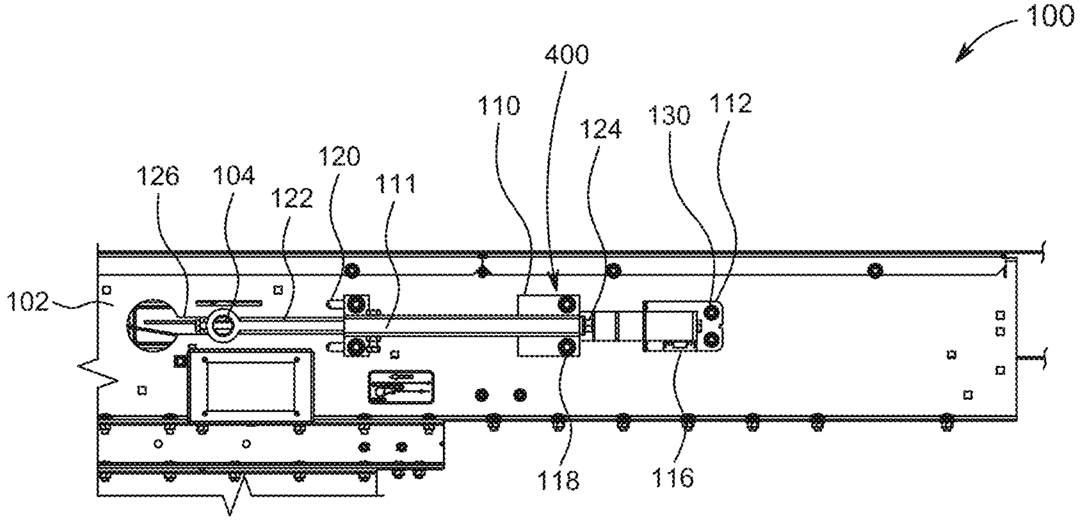
Figure 4B:
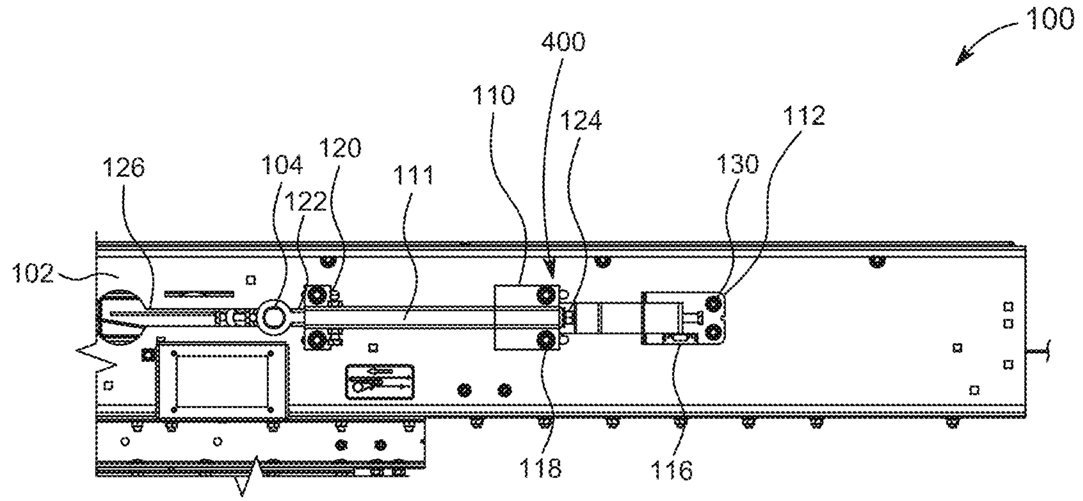
Figure 5A:
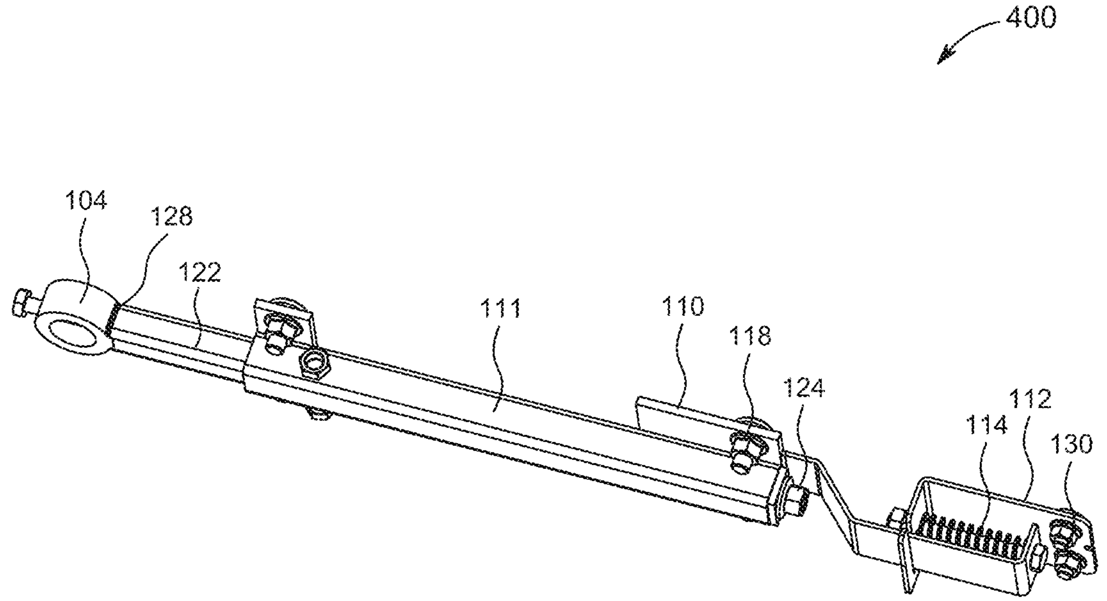
Figure 5B:
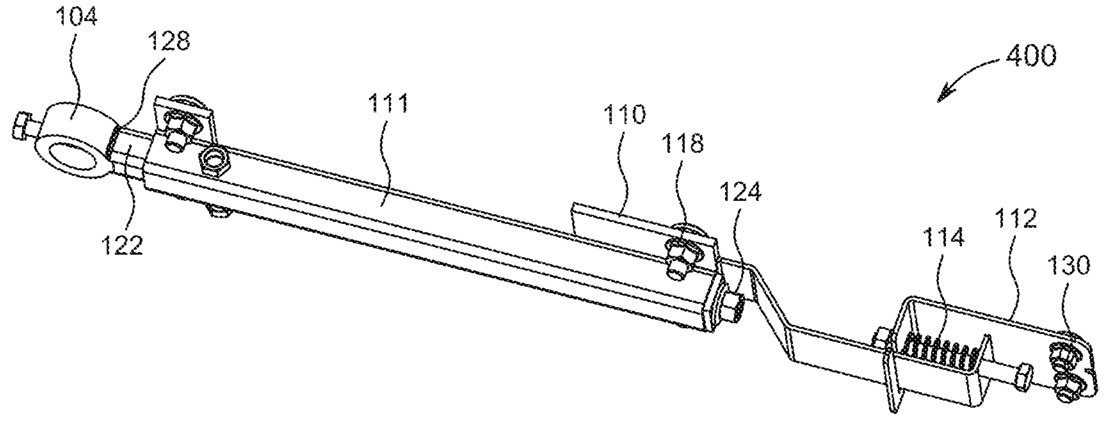

Having thus described certain example embodiments of the present disclosure in general terms, reference will hereinafter be made to the accompanying drawings, which are not necessarily drawn to scale, and wherein:

FIG. 1 illustrates a side view of a conveyor in accordance with a first example embodiment of the present disclosure;

FIG. 2A illustrates the side view of the conveyor showing an extended spring in accordance with the first example embodiment of the present disclosure;

FIG. 2B illustrates the side view of the conveyor showing a compressed spring in accordance with the first example embodiment of the present disclosure;

FIG. 3A illustrates a perspective view of a tensioner assembly showing the extended spring in accordance with the first example embodiment of the present disclosure;

FIG. 3B illustrates a perspective view of the tensioner assembly showing the compressed spring in accordance with the first example embodiment of the present disclosure;

FIG. 4A illustrates a side view of the conveyor showing the extended spring placed in an axis of a tensioner in accordance with a second example embodiment of the present disclosure;

FIG. 4B illustrates the side view of the conveyor showing the compressed spring placed in the axis of the tensioner in accordance with the second example embodiment of the present disclosure;

FIG. 5A illustrates a perspective view of the tensioner assembly showing the extended spring placed in the axis of the tensioner in accordance with the second example embodiment of the present disclosure; and FIG. 5B illustrates the perspective view of the tensioner assembly showing the compressed spring placed in the axis of the tensioner in accordance with the second example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration. Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The present disclosure provides various embodiments of a conveyor. Embodiments may be configured to adjust a tension of a conveyor belt. Further, embodiments may be configured to compress when the tension of the conveyor belt is increased by a tensioner assembly. Embodiments may be further configured to indicate the tension of the conveyor belt. Embodiments may be further configured to indicate an amount of the tension applied on the conveyor belt. Further, embodiments may be configured to rotate in a first direction to facilitate sliding the tensioning rod and the tensioner towards each other to pull the conveyor belt via a roller shaft and increase the tension of the conveyor belt. Further, embodiments may be configured to rotate in a second direction to facilitate sliding the tensioning rod and the tensioner away from each other to push the conveyor belt via the roller shaft and decrease the tension of the conveyor belt.

FIG. 1 illustrates a side view of a conveyor 100, in accordance with a first example embodiment of the present disclosure. FIG. 2A illustrates the side view of the conveyor 100 showing an extended spring 114, in accordance with the first example embodiment of the present disclosure. FIG. 2B illustrates the side view of the conveyor 100 showing a compressed spring 114, in accordance with the first example embodiment of the present disclosure. FIG. 3A illustrates a perspective view of a tensioner assembly 108 showing the extended spring 114, in accordance with the first example embodiment of the present disclosure. FIG. 3B illustrates a perspective view of the tensioner assembly 108 showing the compressed spring 114, in accordance with the first example embodiment of the present disclosure.

In some embodiments, the conveyor 100 may be configured to move one or more objects from one location to another. The conveyor 100 may be used in an industrial, manufacturing, or a logistical environment. The conveyor 100 may automate transportation of the one or more objects. The conveyor 100 may include, but is not limited to, a belt conveyor, a chain conveyor, a roller conveyor, a screw conveyor, or a slat conveyor. The conveyor 100 may be used in manufacturing industry, warehousing, mining, food industry, or logistics.

In some embodiments, the conveyor 100 may comprise a side rail 102, a roller shaft 104, a conveyor belt 106, and a tensioner assembly 108. The side rail 102 may be configured to provide structural support to the conveyor 100. The side rail 102 may correspond to a framework that may house and align the roller shaft 104, and the tensioner assembly 108.

The side rail 102 may be fabricated from strong and durable materials. The side rail 102 may be fabricated from the materials including, but is not limited to steel, aluminum, or metal alloys. The side rail 102 may be configured to withstand forces generated by the conveyor 100 and the tensioner assembly 108.

In some embodiments, the roller shaft 104 may correspond to a central axis around which the conveyor belt 106 may be looped. The roller shaft 104 may be configured to support the conveyor belt 106. The conveyor belt 106 may be wrapped around the roller shaft 104. In some embodiments, the roller shaft 104 may drive along the conveyor belt 106. The roller shaft 104 may be configured to enable the conveyor belt 106 movement and may be further configured to provide a stable base for the tensioner assembly 108. The roller shaft 104 may be coupled to the conveyor belt 106 and the side rail 102.

In some embodiments, the roller shaft 104 may be coupled to the tensioner assembly 108. The tensioner assembly 108 may be configured to adjust the tension in the conveyor belt 106. The tensioner assembly 108 may use mechanical force to pull or push the roller shaft 104 to either increase or decrease the tension in the conveyor belt 106. In some embodiments, the conveyor belt 106 may be configured to maintain a precise tension to ensure optimal operation of the conveyor 100. The conveyor belt 106 may remain tensioned to prevent sagging, misalignment, or slippage during operation of the conveyor 100.

In some embodiments, the conveyor belt 106 may be configured to transport one or more products from a first end of the conveyor 100 to a second end of the conveyor 100. In some embodiments, if the tension is too low, the conveyor belt 106 may slip off the roller shaft 104 or may sag. Further if the tension is too high, the conveyor belt 106 may overstress and may lead to premature wear, damage, or increased power consumption. The conveyor belt 106 may be made from a group of materials including, but is not limited to, a rubber, a PVC, a nylon, a polyester, a stainless steel mesh, or a canvas.

In some embodiments, the tensioner assembly 108 may be coupled to the conveyor belt 106. The tensioner assembly 108 may comprise a tensioner 110, a bracket 112, a spring 114, and an indicator 116. The tensioner assembly 108 may be positioned at the side rail 102 of the conveyor 100. Further, the conveyor 100 may comprise two side rails 102. The tensioner 110 may be movably coupled to the side rail 102. The tensioner 110 may be movably coupled to the side rail 102 of the conveyor 100 via a plurality of bolts 118 and a plurality of slots 120 fabricated on the side rail 102. Each slot of the plurality of slots 120 may provide a degree of movement to a corresponding bolt of the plurality of bolts 118 for providing a sliding movement to the tensioner 110. Further, each bolt of the plurality of bolts 118 may be loosened from the corresponding slot during tensioning of the conveyor belt 106 and each bolt may be tightened within the corresponding slot when the desired tension is achieved.

In some embodiments, each slot of the plurality of slots 120 may be aligned with a corresponding bolt of the plurality of bolts 118. The plurality of slots 120 may be configured to provide the degree of movement for the tensioner 110 to move along the side rail 102 in a sliding motion. The sliding motion of the tensioner 110 may adjust position of the roller shaft 104. In some embodiments, during tensioning of the conveyor belt 106, each bolt of the plurality of bolts 118 may be loosened from the corresponding slot, and may allow the tensioner 110 to move freely along the side rail 102. In some embodiments, once the desired tension is achieved, each bolt of the plurality of bolts 118 may be tightened into each slot of the plurality of slots 120, securing the tensioner 110 in place.

In some embodiments, the bracket 112 may be rigidly coupled to the side rail 102. The bracket 112 may correspond to a supporting bracket. The bracket 120 may be attached to the side rail 102 in a fixed position. Further, the bracket 112 may be configured to provide an anchor point for the spring 114. The bracket 112 may be rigidly attached to the side rail 102 using one or more fasteners 130. The one or more fasteners 130 may comprise bolts or welds. The bracket 112 may not move during operation of the conveyor 100 and/or when the conveyor belt 106 is being tensioned.

In some embodiments, the bracket 112 may be attached to the side rail 102 to bear forces exerted during tensioning of the conveyor belt 106. The bracket 112 may be configured to withstand the forces without bending or deforming. The bracket 112 may be configured to provide structural support and alignment for the tensioner 110. Further, the bracket 112 may be made from a group of materials, including, but is not limited to, steel and aluminium. The bracket 112 may be coated with protective finishes to enhance durability and resistance to wear and tear of the bracket 112. The protective finishes may comprise powder coating, galvanization, or anodizing. The protective finishes may prevent corrosion and may extend lifespan of the bracket 112. In some embodiments, the bracket 112 may ensure that at least a portion of the tensioner assembly 108 (e.g., an end of the spring 114) remains fixed in a position relative to the side rail 102. The bracket 112 may prevent unwanted movement or misalignment of the tensioner 110 during tensioning of the conveyor belt 106 by maintaining the position of the end of the spring 114 of the tensioner assembly 108.

In some embodiments, the tensioner assembly 108 may further comprise the spring 114. The spring 114 may be positioned between the tensioner 110 and the bracket 112. The spring 114 may be configured to compress when the tension of the conveyor belt 106 is increased by the tensioner assembly 108. The spring 114 may be further configured to facilitate the measurement of the tension in the conveyor belt 106. The spring 114 may be placed proximate to a tensioning rod 122 of the tensioner assembly 108. For example, the spring 114 may be placed at a location that is upward from the tensioning rod 122, as depicted, or downward from the tensioning rod 122. A center axis of the spring 114 may be parallel to a longitudinal center axis of the tensioning rod 122.

In some embodiments, the spring 114 may have a predefined stiffness. The predefined stiffness of the spring 114 may correspond to amount of force the spring 114 may resist when compressed. The predefined stiffness may be calibrated based at least on an elongation and a width of the conveyor belt 106. The elongation may correspond to 0.3%. In one example, the conveyor belt 106 with greater elongation may require the spring 114 with higher stiffness to maintain the desired tension. In another example, the wider conveyor belt 106 may also require the spring 114 with the higher stiffness to maintain the desired tension. In some embodiments, the predefined stiffness of the spring 114 may depend upon a size of the conveyor 100, load capacity of the conveyor 100, and the material of the conveyor belt 106.

In some embodiments, the spring 114 may be configured to compress or extend based at least on the force applied by the conveyor belt 106. The amount of compression or extension of the spring 114 may be directly related to the force applied by the conveyor belt 118. In some embodiments, by compressing or extending the spring 114, the spring 114 may allow the indicator 116 to display the tension applied to the conveyor belt 106.

In some embodiments, the tensioner assembly 108 may further comprise the indicator 116. The indicator 116 may be positioned parallel to the spring 114. For example, measurement indications (e.g., a "scale) on the indicator 116 may collectively extend parallel to the center axis of the spring 114. The indicator 116 may be configured to indicate the tension of the conveyor belt 106. The indicator 116 may correspond to a scale that may be calibrated with a predefined tension and may be configured to indicate an amount of tension applied on the conveyor belt 106. The predefined tension may be based at least on the elongation and the width of the conveyor belt 106. Placement of the indicator 116 may be flexible. The indicator 116 may be positioned on the tensioner 110 or may be coupled to the side rail 102 of the conveyor 100. For example, the indicator 116 may be at a location that is upward from the tensioning rod 122 or downward from the tensioning rod 122, as depicted.

In some embodiments, the indicator 116 may work in conjunction with the spring 114. The indicator 116 may be configured to display the amount of tension applied to the conveyor belt 106. Further, as the spring 114 compresses during the tensioning of the conveyor belt 106, the indicator 116 may show the corresponding tension. The indicator 116 may be further configured to determine whether the tension may be too low, too high, or within the desired range. The readings of the indicator 116 may be synchronized and/or calibrated with the spring's compression.

In some embodiments, the indicator 116 may provide a visual indication of the tension of the belt to the user that may allow the user to adjust the tension accurately to ensure the tension may be within an optimal range. The indicator 116 may correspond to the scale. The scale may correspond to a linear scale that may provide a reading of the tension. The user may correspond to an operator, a maintainer, or an installer.

In some embodiments, the scale may include markings that may indicate a tension range. The markings may be linear and may include color-coded sections to denote optimal, low, and high tension of the conveyor belt 106. The scale may be further configured to indicate under-tensioning as well as over-tensioning. Under-tensioning may lead to slippage of the conveyor belt 106, and over-tensioning may cause excessive wear of the conveyor belt 106.

In some embodiments, initially, the indicator 116 may indicate 0 force value when there is no force exerted on the spring 114. The spring 114 may be pre-tensioned to the predefined tension. The pre-tensioning of the spring 114 may ensure that the indicator 116 may indicate the predefined tension. The user may monitor and adjust the tension in the conveyor belt 106.

In some embodiments, the indicator 116 may be configured to indicate the tension force being applied by the spring 114 due to the compression of the spring 114. In some embodiments, as the tensioning bolt 124 is rotated in the first direction, the spring 114 may be compressed, and the tension may be displayed on the indicator 116. In some embodiments, after rotating the tensioning bolt 124, the conveyor belt 106 may achieve the desired tension. The desired tension may be indicated by the reading on the scale. In some embodiments, the tension indicated by the indicator 116 on both side rails 102 of the conveyor 100 may be equal. In some embodiments, once equal tension is verified at both side rails 102 of the conveyor 100, the tensioner assembly 108 may be securely fixed in place to maintain the desired tension. For example, each bolt of a plurality of bolts 118 may be tightened to maintain the position of the tensioner 110 of the tensioner assembly 108.

In some embodiments, the tensioner assembly 108 may further comprise a tensioning rod 122 positioned within the tensioner 110. For example, the tensioner 110 may have an elongated body 111 that defines a longitudinally-extending slot that the tensioning rod 122 may be positioned within. The tensioner assembly 108 may further comprise a tensioning bolt 124 coupled to the tensioning rod 122 and positioned within a hole of the tensioner 110 and the tensioning rod 122. The tensioning rod 122 and the tensioning bolt 124 may be configured to adjust the tension of the conveyor belt 106. The tensioner assembly 108 may be coupled to the roller shaft 104 via the tensioning rod 122. Further, by rotating the tensioning bolt 124, the user may alter position of the tensioning rod 122 relative to the tensioner 110. For example, the tensioning bolt 124 may comprise a bolt head and a threaded portion. The bolt head of the tensioning bolt 124 may be sized such that the bolt head is larger than the hole of the tensioner 110 that the tensioning bolt 124 extends through. As such, only the threaded portion of the tensioning bolt 124 may be positioned within the elongated body 111 of the tensioner 110 and within a hole of the tensioning rod 122. The hole of the tensioning rod 122 may have internal threads that mate with the threads on the threaded portion of the tensioning bolt 124. As such, rotation in a first direction may move the tensioning rod 122 towards the bolt head of the bolt. Because the end portion of the tensioner 110 that the tensioning bolt 124 extends through is between the bolt head of the tensioning bolt 124 and the tensioning rod 122, the tensioner 110 and the tensioning rod 122 may move towards each other (e.g., such that the tensioning rod 122 retracts into the elongated body 111 of the tensioner 110).

In some embodiments, rotation of the tensioning bolt 124 in the first direction may facilitate in sliding the tensioning rod 122 and the tensioner 110 towards each other to pull the conveyor belt 106 via the roller shaft 104 and may increase the tension of the conveyor belt 106. The sliding of the tensioning rod 122 and the tensioner 110 towards each other may pull the roller shaft 104 (as shown in FIG. 2B and FIG. 3B). Further, the spring 114 may compress and may increase the tension. The sliding of the tensioning rod 122 and the tensioner 110 towards each other (shown by 128) may increase the tension on the conveyor belt 106. The rotation of the tensioning bolt 124 in the first direction may pull the conveyor belt 106 tighter as the roller shaft 104 is drawn inward by the tensioning rod 122. The roller shaft's 104 movement may cause the conveyor belt 106 to stretch, and the increased tension may be absorbed by the spring 114. The first direction may correspond to a clockwise direction.

In some embodiments, rotation of the tensioning bolt 124 in a second direction may facilitate in sliding the tensioning rod 122 and the tensioner 110 away from each other (e.g., such that the tensioning rod 122 extends outwards from an interior of the elongated boy 111 of the tensioner 110) to push the conveyor belt 106 via the roller shaft 104 and may decrease the tension of the conveyor belt 106. Further, the spring 114 may extend and may decrease the tension (as shown in FIG. 2A and FIG. 3A). The second direction may correspond to a counter-clockwise direction. The roller shaft 104 may be pushed outward. The movement of the roller shaft 104 in the outward direction may result in a reduction of the tension on the conveyor belt 106 (as shown in FIG. 2A and FIG. 3A).

In some embodiments, the roller shaft 104 may be coupled to the tensioning rod 122, which in turn may be coupled to the tensioning bolt 124. When the tensioning bolt 124 is rotated, the tensioning bolt 124 may cause the tensioning rod 122 to move. In some embodiments, rotational motion of the tensioning bolt 124 may translate the rotation of the tensioning bolt 124 into a linear movement of the roller shaft 104.

In some embodiments, the tensioning bolt 124 when rotated, may cause the roller shaft 104 to move along a guide rail 126. The guide rail 126 may correspond to a track along which the tensioning rod 122 and the roller shaft 104 may move. The movement of the roller shaft 104 may translate the rotational motion of the tensioning bolt 124 into a linear displacement of the roller shaft 104.

FIG. 4A illustrates a side view of the conveyor 100 showing the extended spring 114 (FIG. 5A) placed in an axis of the tensioner 110, in accordance with a second example embodiment of the present disclosure. FIG. 4B illustrates the side view of the conveyor 100 showing the compressed spring 114 (FIG. 5B) placed in the axis of the tensioner 110, in accordance with the second example embodiment of the present disclosure. FIG. 5A illustrates a perspective view of the tensioner assembly 108 showing the extended spring 114 placed in the axis of the tensioner 110, in accordance with the second example embodiment of the present disclosure. FIG. 5B illustrates the perspective view of the tensioner assembly 400 showing the compressed spring 114 placed in the axis of the tensioner 110, in accordance with the second example embodiment of the present disclosure.

In some embodiments, the conveyor 100 may comprise the side rail 102, the roller shaft 104, the conveyor belt 106, and the tensioner assembly 400. In some embodiments, the roller shaft 104 may be coupled to the tensioner assembly 400. The tensioner assembly 400 may be configured to adjust the tension in the conveyor belt 106. The tensioner assembly 400 may use mechanical force to pull or push the roller shaft 104 to either increase or decrease the tension in the conveyor belt 106. In some embodiments, the conveyor belt 106 may be configured to maintain the precise tension to ensure optimal operation of the conveyor 100. The conveyor belt 106 may remain tensioned to prevent sagging, misalignment, or slippage during operation of the conveyor 100.

In some embodiments, the tensioner assembly 400 may comprise the tensioner 110, the bracket 112, the spring 114, and the indicator 116. The tensioner assembly 400 may be positioned at the side rail 102 of the conveyor 100. Further, the conveyor 100 may comprise two side rails 102. The tensioner 110 may be movably coupled to the side rail 102. The tensioner 110 may be movably coupled to the side rail 102 of the conveyor 100 via the plurality of bolts 118 and the plurality of slots 120 fabricated on the side rail 102.

In some embodiments, the spring 114 may be coaxial with the tensioner 110. The bracket 112 and the indicator 116 may be longitudinally aligned with the tensioner 110. The indicator 116 may be positioned downward from the spring 114. The bracket 112 may be attached to the side rail 102 to bear forces exerted during tensioning of the conveyor belt 106. The bracket 112 may be configured to withstand the forces without bending or deforming.

In some embodiments, the spring 114 may be configured to compress when the tension of the conveyor belt 106 is increased by the tensioner assembly 400. The spring 114 may be further configured to measure the tension in the conveyor belt 106. The spring 114 may be placed within the axis of the tensioner 110. In some embodiments, the spring 114 may have the predefined stiffness. The predefined stiffness of the spring 114 may correspond to the amount of force the spring 114 may resist when compressed. The predefined stiffness may be calibrated based at least on an elongation and a width of the conveyor belt 106.

In some embodiments, the tensioner assembly 400 may further comprise the indicator 116. The indicator 116 may be positioned proximate to and parallel with the axis of the spring 114. The indicator 116 may be on the bracket 112. The indicator 116 may be configured to indicate the tension of the conveyor belt 106. The indicator 116 may correspond to a scale that may be calibrated with a predefined tension and may be configured to indicate an amount of tension applied on the conveyor belt 106. The predefined tension may be based at least on the elongation and the width of the conveyor belt 106.

In some embodiments, the spring 114 and the bracket 112 may be positioned on the axis of the tensioner 110 (e.g., a longitudinally extending center axis of the tensioner). Further, the tensioning bolt 124 may be positioned along the axis of the tensioner 110. In some embodiments, when the tensioning bolt 124 is rotated in the first direction, the rotation may move the tensioning rod 122 and the tensioner 110 towards each other (as shown in FIGS. 4B and 5B). The rotation of the tensioning bolt 124 may pull the roller shaft 104 inward. The rotation of the tensioning bolt 124 in the first direction may cause the conveyor belt 106 to tighten. As the roller shaft 104 is pulled inward, the conveyor belt 106 may be stretched and may increase the tension. Further, the spring 114 may be compressed (as shown in FIGS. 4B and 5B).

In some embodiments, when the tensioning bolt 124 is rotated in the second direction, the rotation may move the tensioning rod 122 and the tensioner 110 away from each other (as shown in FIGS. 4A and 5A). The rotational movement of the tensioning bolt 124 in the second direction may push the roller shaft 104 outward. The rotation of the tensioning bolt 124 in the second direction may cause the conveyor belt 106 to loosen. As the roller shaft 104 moves outward, the tension on the conveyor belt 106 may decrease, and the spring 114 may return to the extended position (as shown in FIGS. 4A and 5A).

The present disclosure offers several advantages, including desired tension adjustment through the spring 114 that prevents over-tensioning or under-tensioning of the conveyor belt 106. The present disclosure further offers integration of the indicator 116 in the conveyor 100 and allows for real-time monitoring of the tension. The present disclosure ensures optimal performance and prevents the conveyor belt 106 slippage or excessive wear. The conveyor 100 is also designed for ease of use, with the tensioning bolt 124 that can be rotated in the first direction or the second direction to increase or decrease the tension as needed, providing flexibility and fine control during operation of the conveyor 100. The present disclosure improves the longevity of the conveyor belt 106 and reduces maintenance requirements.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A conveyor, comprising:

a side rail;

a roller shaft coupled to the side rail;

a conveyor belt positioned around the roller shaft; and a tensioner assembly coupled to the roller shaft and configured to adjust a tension of the conveyor belt, the tensioner assembly comprising:

a tensioner movably coupled to the side rail;

a bracket rigidly coupled to the side rail;

a spring positioned between the tensioner and the bracket, the spring is configured to compress when the tension of the conveyor belt is increased by the tensioner assembly;

a tensioning rod, wherein the tensioning rod is disposed in the tensioner, and wherein the spring is positioned one of over the tensioning rod or under the tensioning rod; and an indicator positioned parallel to the spring, wherein the indicator is configured to indicate the tension of the conveyor belt.

2. The conveyor of claim 1, wherein the tensioner assembly comprises:

a tensioning bolt coupled to the tensioning rod and positioned within a hole of the tensioner and a hole of the tensioning rod, wherein the tensioner assembly is coupled to the roller shaft via the tensioning rod.

3. The conveyor of claim 2, wherein rotation of the tensioning bolt in a first direction facilitates in sliding the tensioning rod and the tensioner towards each other to pull the conveyor belt via the roller shaft and increase the tension of the conveyor belt, and wherein the first direction corresponds to a clockwise direction.

4. The conveyor of claim 2, wherein rotation of the tensioning bolt in a second direction facilitates in sliding the tensioning rod and the tensioner away from each other to push the conveyor belt via the roller shaft and decrease the tension of the conveyor belt, and wherein the second direction corresponds to a counter-clockwise direction.

5. The conveyor of claim 1, wherein the tensioner is movably coupled to the side rail of the conveyor via a plurality of bolts and a plurality of slots fabricated on the side rail.

6. The conveyor of claim 5, wherein each slot of the plurality of slots provides a degree of movement to a corresponding bolt of the plurality of bolts for providing a sliding movement to the tensioner.

7. The conveyor of claim 5, wherein each bolt of the plurality of bolts is loosened from a corresponding slot during tensioning of the conveyor belt and each bolt is tightened within the corresponding slot when a desired tension is achieved.

8. The conveyor of claim 1, wherein the spring has a predefined stiffness, and wherein the predefined stiffness is calibrated based at least on an elongation and a width of the conveyor belt.

9. The conveyor of claim 1, wherein the indicator corresponds to a scale that is calibrated with a predefined tension and is configured to indicate an amount of tension applied on the conveyor belt.

10. The conveyor of claim 1, wherein the indicator is one of positioned on the tensioner or coupled to the side rail of the conveyor.

11. A tensioner assembly configured to be coupled to a roller shaft of a conveyor, the tensioner assembly comprising:

a tensioner configured to be movably coupled to a side rail of the conveyor;

a bracket configured to be rigidly coupled to the side rail;

a spring positioned between the tensioner and the bracket, wherein the spring is configured to compress when a tension of a conveyor belt is increased by the tensioner assembly;

a tensioning rod, wherein the tensioning rod is disposed in the tensioner, and wherein the spring is positioned one of over the tensioning rod or under the tensioning rod; and an indicator configured to be positioned parallel to the spring, wherein the indicator is configured to indicate the tension of the conveyor belt.

12. A method, comprising:

coupling a roller shaft to a side rail;

positioning a conveyor belt around the roller shaft;

movably coupling a tensioner to the side rail;

disposing a tensioning rod in the tensioner;

rigidly coupling a bracket to the side rail;

compressing a spring when the tension of the conveyor belt is increased by a tensioner assembly, wherein the spring is positioned between the tensioner and the bracket, and wherein the spring is positioned one of over the tensioning rod or under the tensioning rod; and indicating, via an indicator, the tension of the conveyor belt, wherein the indicator is positioned parallel to the spring.

13. The method of claim 12, further comprising:

positioning a tensioning bolt coupled to the tensioning rod within a hole of the tensioner and a hole of the tensioning rod, wherein the tensioner assembly is coupled to the roller shaft via the tensioning rod.

14. The method of claim 13, further comprising rotating the tensioning bolt in a first direction to facilitate sliding of the tensioning rod and the tensioner towards each other to pull the conveyor belt via the roller shaft and increase the tension of the conveyor belt, and wherein the first direction corresponds to a clockwise direction.

15. The method of claim 13, further comprising rotating the tensioning bolt in a second direction to facilitate sliding of the tensioning rod and the tensioner away from each other to push the conveyor belt via the roller shaft and decrease the tension within the conveyor belt, and wherein the second direction corresponds to a counter-clockwise direction.

16. The method of claim 12, wherein the tensioner is movably coupled to the side rail of a conveyor via a plurality of bolts and a plurality of slots fabricated on the side rail.

17. The method of claim 16, wherein each slot of the plurality of slots provides a degree of movement to a corresponding bolt of the plurality of bolts for providing a sliding movement to the tensioner.

18. The method of claim 16, further comprising loosening each bolt of the plurality of bolts from a corresponding slot during tensioning of the conveyor belt and each bolt is tightened within the corresponding slot when a desired tension is achieved.

19. The method of claim 12, wherein the spring has a predefined stiffness, wherein the predefined stiffness is calibrated based at least on an elongation and a width of the conveyor belt, and wherein the indicator corresponds to a scale that is calibrated with a predefined tension and is configured to indicate an amount of tension applied on the conveyor belt.

20. The method of claim 12, further comprising one of positioning the indicator on the tensioner or coupling to the side rail of a conveyor.

* * * * *